US005475369A

United States Patent [19]
Baker

[11] Patent Number: 5,475,369
[45] Date of Patent: Dec. 12, 1995

[54] ANIMAL ACTUATING SIGNALING DEVICE

[76] Inventor: William J. Baker, 753 Payne Ave., North Tonawanda, N.Y. 14120

[21] Appl. No.: 449,771

[22] Filed: May 24, 1995

[51] Int. Cl.⁶ .................................................. G08B 21/00
[52] U.S. Cl. ..................... 340/573; 119/174; 340/286.11; 340/328; 340/539; 341/176
[58] Field of Search ...................................... 340/573, 539, 340/286.11, 328, 384.1; 341/176; 119/174

[56] References Cited

U.S. PATENT DOCUMENTS

| | | | |
|---|---|---|---|
| 2,634,409 | 4/1953 | Walcher | 340/393.2 |
| 3,594,748 | 7/1971 | Grotjahn | 340/539 |
| 4,400,696 | 8/1983 | Klingensmith | 340/573 |
| 4,686,504 | 8/1987 | German | 340/573 |
| 5,303,677 | 4/1994 | Jones | 340/286.11 |
| 5,365,214 | 11/1994 | Angott et al. | 340/328 |

Primary Examiner—Glen Swann
Attorney, Agent, or Firm—James J. Ralabate

[57] ABSTRACT

This pet sounding device contains all insulating major components so as to be non-conductive upon use or pet contact. The device has two attached rectangular plates connected on only one end. In between these plates is sandwiched a wireless transmitter that can be activated upon contact by the pet with one of the plate components. The transmitter is in wireless contact with a sound receiver which will emit a sound, chimes or voice upon being activated by the transmitter.

16 Claims, 3 Drawing Sheets

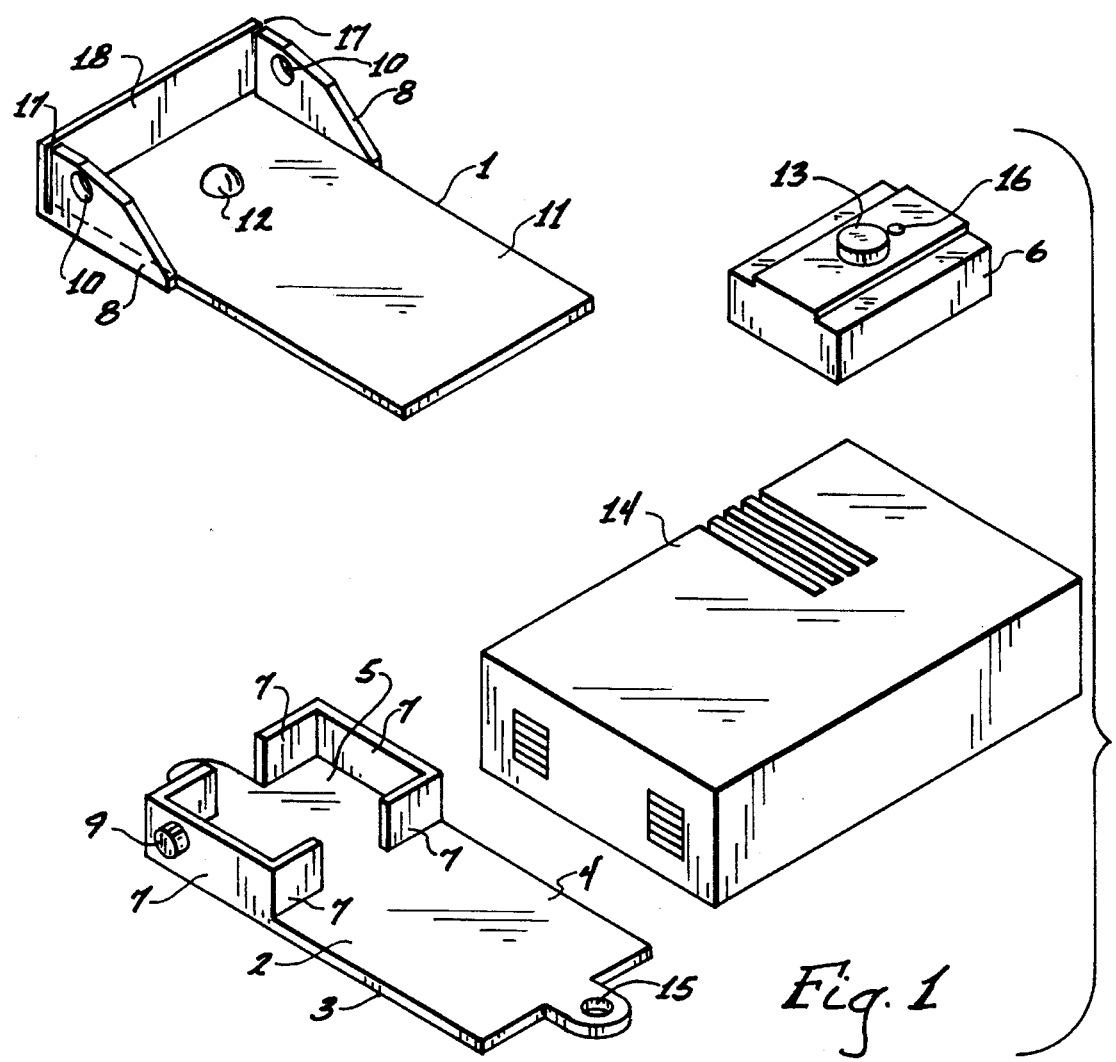
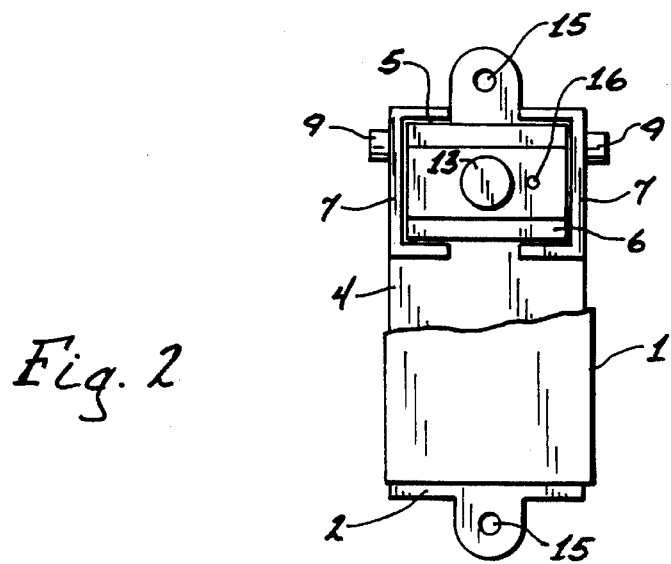

ANIMAL ACTUATING SIGNALING DEVICE

This invention relates to a signaling device suitable for animal use but also adapted for use by humans. More specifically, the device of this invention provides a simple, portable unit that requires no hard wiring or complicated installation.

BACKGROUND OF THE INVENTION

It is known to use various signal sounding devices that are adapted specifically for animal or pet uses. These devices usually are installed at or near the entrance of a house or other structure so they can be activated by a pet when entering or exiting a house. The pet doorbell in most cases is hard-wired as are most doorbells but placed at a lower location so that a dog or other pet can activate the doorbell by merely pushing or pressing on it. These electric signaling bells or devices can be complicated in structure and because of their outdoor existence, can be easily damaged by the elements.

Some of these type sound signaling devices are disclosed in U.S. Pat. Nos. 2,634,409; 4,400,696; 4,686,504; and 5,303,677. In U.S. Pat. No. 2,634,409 (Walcher) a conventional push bell is disclosed which can be activated by a push button or by a switch that is activated by releasing pressure on the switch component. In the Walcher device an aperture is drilled through a wall or door 35 and wires 37 extended therethrough from an exterior push button 36 to an interior base plate 10 with sounding components attached thereto. Once installed, this type of device is permanently in place and cannot be moved without repair of previous holes or apertures used in the installation.

In U.S. Pat. No. 4,400,696 (Klingensmith) an animal actuated attention attracting apparatus is disclosed located at a level convenient for a pet or other animal. This prior art device is activated by a lever type switch which causes an electric circuit to ring a bell or flash a light. Klingensmith's device is somewhat complex and requires a hinged panel which is secured to the outside of the door or wall by threaded screws 43. Klingensmith's device requires an adjustable spring means as described by Klingensmith as being built in the hinge. As shown in this prior art patent, the device is permanently attached and is hard-wired to the supporting structures.

In U.S. Pat. No. 4,686,504 (German) a pet-operable annunciator is disclosed which utilizes a lever projecting outwardly through a housing. German's device is also mounted on a wall adjacent the door through which the pet enters. It can be permanently secured to the wall or it can be secured with VELCRO® or the like. The activating lever 30 and the sounding chime are in the same structure or housing of the German device. Thus, if used outside a door, the entire unit is exposed to the weather and can be damaged by rain, snow or air oxidation.

In U.S. Pat. No. 5,303,677 (Jones) a pet entrance pager is disclosed that can be fitted over the vertical edge of a door by a non-skid material. Jones utilizes metal springs 21 together with other metal components such as studs 5 and casing 12 which is soldered to the channel means 4. As in all of the above discussed prior art pet usable structures, the activating means which the dog or pet engages is in the same housing as or immediately adjacent to the sounding means. Usually all that separates these two means is a door or wall thickness.

There is therefore a need for a wireless, rust-proof, weather-proof pet alarm system or device that is simple, relatively easy to manufacture, convenienet to use and not requiring separate spring or lever components.

SUMMARY OF THE INVENTION

It is therefore an object of this invention to provide a pet sounding-signaling device that is devoid of the above noted disadvantags.

Another object of this invention is to provide a simply constructed, effective and convenient pet alarm or signaling device.

Still another object of this invention is to provide a portable, simple to use sounding device that can be located anywhere convenient, and easily relocated.

Yet another object of this invention is to provide a three unit sound system that is free from metal hinges, springs, levers or other like components.

Another object of this invention is to provide a pet sounding system where the activating means can be used at a substantial distance from the sounding means.

Another still further object of this invention is to provide a substantially non-conductive pet sound system that is also non-corrosive, non-toxic and structurally sound.

Another yet further object of this invention is to provide a pet sounding system that is simple and easy to train a pet to use.

These and other objects of this invention are accomplished, generally speaking, by a three unit (or four component) pet doorbell or sounding system that comprises a wireless transmitter, a companion wireless receiver and a two piece plastic or non-conductive housing. The transmitter fits into said two piece housing and acts as the activation or activating means to the system of this invention. The wireless transmitter and receiver are the type obtained from the Heath Company of Benton Harbor, Mich. and identified as Model SL-6162. Obviously any similar and suitable wireless transmitter and receiver may be used in the system of the present invention. The Heath transmitter has a small, flexible, raised button extending upwardly from one of its rectangular surfaces. When placed in the housing, this button is faced upwardly so as to be adjacent and slightly out of contact with a downwardly extending dimple in said housing. The housing is made up of only two movably connected pieces, an upper lid section and a lower bottom base section. The upper lid has a rectangular configuration (as does the lower section) with an inwardly projecting dimple that will be adjacent said above noted raised button when the entire unit is assembled. It also will be in alignment with a compartment section that is located in the bottom base section of the housing. The wireless transmitter will fit into and will be enclosed by the compartment section of the lower base section. When placed in this compartment, the transmitter is installed so that the button faces upwardly and will be activated when touched by exertion of pressure on the upper lid section. This pressure will cause the dimple in the upper lid to touch the button and sound off the bell or chimes (or voice) from the remote receiver component. The system can be arranged so that various sounds can be emitted to indicate reason for alarm, such as a double chime for the pet to exit the house, a single chime to enter. Also any variation of sounds can be used for use or location indications. The receiver component can be located anywhere within range of the activated transmitter. As above noted, the lid and the base sections of the housing are movably connected at one of their terminal end portions. They are connected so that they can be moved toward each other or inwardly upon the exertion of pressure upon the lid section. The outside faces of each section are substantially flat, while the inner faces have mating walls that form the compartment in which the transmitter will fit. Also at least one of the sections will have an aperture or VELCRO® sections on one end for hanging the entire unit on a nail or other VELCRO® supporting surface. A feature of the present invention is that the housing containing the transmitter and the receiver-sound means are portable and can be located anywhere convenient. Also the system is simple to install without requiring any holes to be drilled into walls or doors. The unit can be used as a signal means for disabled persons in addition to its main focus which is a sound system operable by animals easily trained for its use.

The transmitter and receiver are relatively small and lightweight and can be easily used with the housing described earlier. The Heath Company transmitter has a model no. SL6162-TX and the Heath receiver has a model no. SL6162-RX. The components of the unit of this invention are of a primarily non-conductive material such as plastic, fiberglass or other non-conductive composition. The unit was constructed of polycarbonate compositions because of its strength, insulating properties and resiliency. The two sections of the housing are movably connected to each other by mating means such as projections, dimples, apertures with fitted elongated projections, etc. Any suitable connecting means may be used provided the section parts can be separated when inserting the transmitter. Alternatively, the transmitter can be inserted into the unit by any suitable means. Also they should be movably connected so as to allow the inwardly projecting dimple on the upper lid to contact the button on the transmitter when the pet slightly applies pressure upon the lid. The unit can be easily moved up or down as the pet varies in size. The proper mounting is important in that it provides the pet with maximum leverage when operating the unit. The wireless unit of this invention generally has a 50 foot radius but any suitable wireless transmitter with any radius and receiver can be used. Also volumes can be easily adjusted depending upon the location of the sound receiver, etc. As earlier noted, other uses for the unit of this invention include sickroom use, emergency help systems, as assistance to the elderly, use by small children or others that are unable to reach the height of a standard doorbell. Also the unit can be used in offices or in small business or stores or the like. The unit can conveniently be mounted on a wheel chair, crutches, walkers, wheel chair ramps or the like.

BRIEF DESCRIPTION OF THE DRAWING

FIG. 1 is a perspective view of the disassembled unit of this invention illustrating the component parts thereof.

FIG. 2 is a top plan view of the unit fully assembled including the transmitter of the sound system.

DETAILED DESCRIPTION OF THE DRAWING AND THE PREFERRED EMBODIMENT

Figure 3:
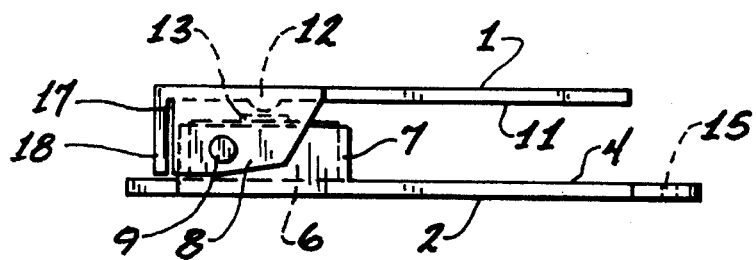
FIG. 3 is a side plan view of the unit fully assembled including the transmitter of the sound system.

In FIG. 1 the system of this invention is shown with the housing unit disassembled into upper lid 1 and lower base section 2. The base lower section 2 is lying flat on its outer surface or face 3 with its inner face 4 facing upwardly. The lower section 2 has a rectangular compartment 5 which will hold and house the transmitter 6. The compartment 5 is made up of wall portions 7 which will mate with the walls 8 and 18 of upper lid 1 when the unit is assembled. Walls 8 can be easily flexed outwardly when connecting lid 1 to base 2 via apertures 10 and projections 9. Also apertures 10 and projections 9 provide leverage when pressure is applied to move lid 1 toward base 2. Extending outwardly from the side of side walls 7 are projections 9 that will movably fit into apertures 10 in the upper lid 1 when the unit is assembled. While lid 1 is illustrated in FIG. 1 as having its inner face 11 facing upward, when assembled, face 11 will face inwardly toward face 4 of lower base section 2. When face 11 is adjacent face 4, the inwardly extending dimple 12 will abut button 13 in wireless transmitter 6 as shown in FIG. 3. Upon pressure on lid 1, dimple 12 will come into contact with button 13 and sound the signal via the transmitter 6 and wireless receiver 14. On either lid 1 or lower section 2 there is located mounting means such as an aperture 15 or VELCRO® fasteners, whichever is desirable. An alert light 16 is positioned on top of transmitter 6 to indicate that system is turned on.

In FIG. 2 a top front view of the transparent assembled housing unit is illustrated with transmitter 6 in compartment 5. The unit can be transparent or colored. The lid section 1 is super-imposed over and movably connected to base section 2 via base section projections 9 which fit into apertures 10 in the lid 1. The walls 7 of base section 2 fit into walls 8 of the lid section 1. The dimple 12 of lid 1 fits immediately over and slightly out of contact with button 13 of transmitter 6 when the unit is assembled. Extending out from at least one terminal end of either lid 1 or base 2 are mounting means 15, here illustrated as apertures 15. Upon slight touching of lid 1, it will move inwardly so that dimple 12 touches button 13 and activates transmitter 6 which in turn sends electrical signals to wireless receiver 14 to sound a chime, bell or voice. Transmitter 6 can be made a permanent part of the housing if desired; however, it is preferred to be removable therefrom.

In FIG. 3 a side view of the assembled unit is illustrated where dimple 12 is so slightly separated from button 13. Pushing down on lid 1 (when in horizontal mode), or pushing forward on lid 1 when the unit is in a vertical position, will sound the system. While the lid 1 can be moved forward (toward button 13) or down toward button 13 it will be returned to its original position by the spring action of button 13. Button 13 in transmitter 6 has a built-in spring action that will allow button 13 to be depressed and then to be returned to its original unactivated position as shown out of contact with dimple 12.

Figure 4:
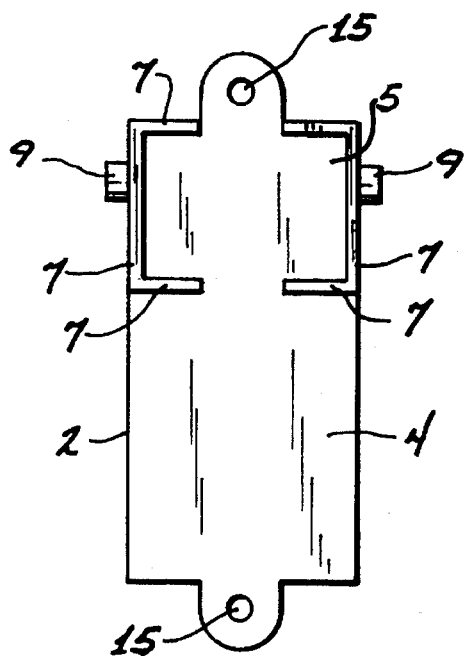
FIG. 4 is a top plan view of the lower or bottom base section illustrating the compartment into which the transmitter will fit.
Figure 5:
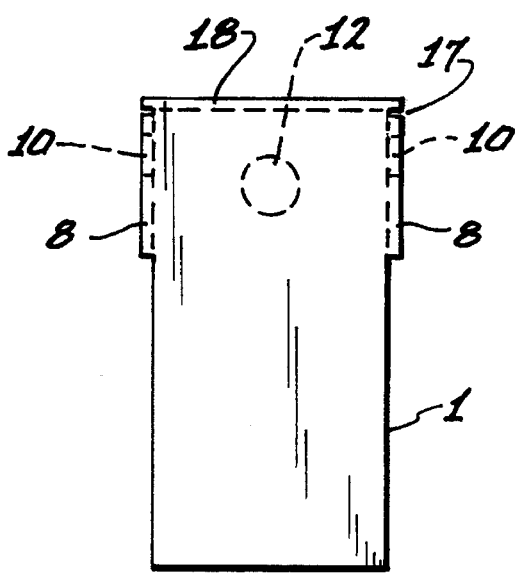
FIG. 5 is a top plan view of the upper lid section illustrating the dimple that extends out from the inner face of said lid section.

In FIG. 4 base section 2 is shown from a top view. Clearly illustrated is the compartment 5 having side walls 7. It should be understood that compartment 5 can be located in either the lid or base 2 if desired. Note that walls 7 are not as wide across as are walls 8 of lid 1 as shown in FIG. 5. It can from this be understood that walls 7 fit within walls 8 when the unit is assembled. Projections 9 of base unit 2 will fit into apertures 10 of lid section 1 to allow lid 1 to move forward upon the exertion of pressure and also to allow lid 1 to be separated from base 2 when transmitter 6 is to be removed for any reason. To facilitate this separation walls 8 of lid 1 are very flexible, yet sturdy enough to lock in place when projections 9 and apertures 10 are mated. There is a slight separation 17 between walls 8 and 18 to insure adequate flexibility of walls 8 independent of end walls 18. This separation 17 is clearly illustrated in FIGS. 1, 3, 5 and 7. The surface area of lid 1 is purposely made large so as to provide the pet with a large area to easily make contact with. For ease of manufacturing and use it is preferred that lid 1 and base 2 have substantially the same area and general outside configuration.

Figure 6:
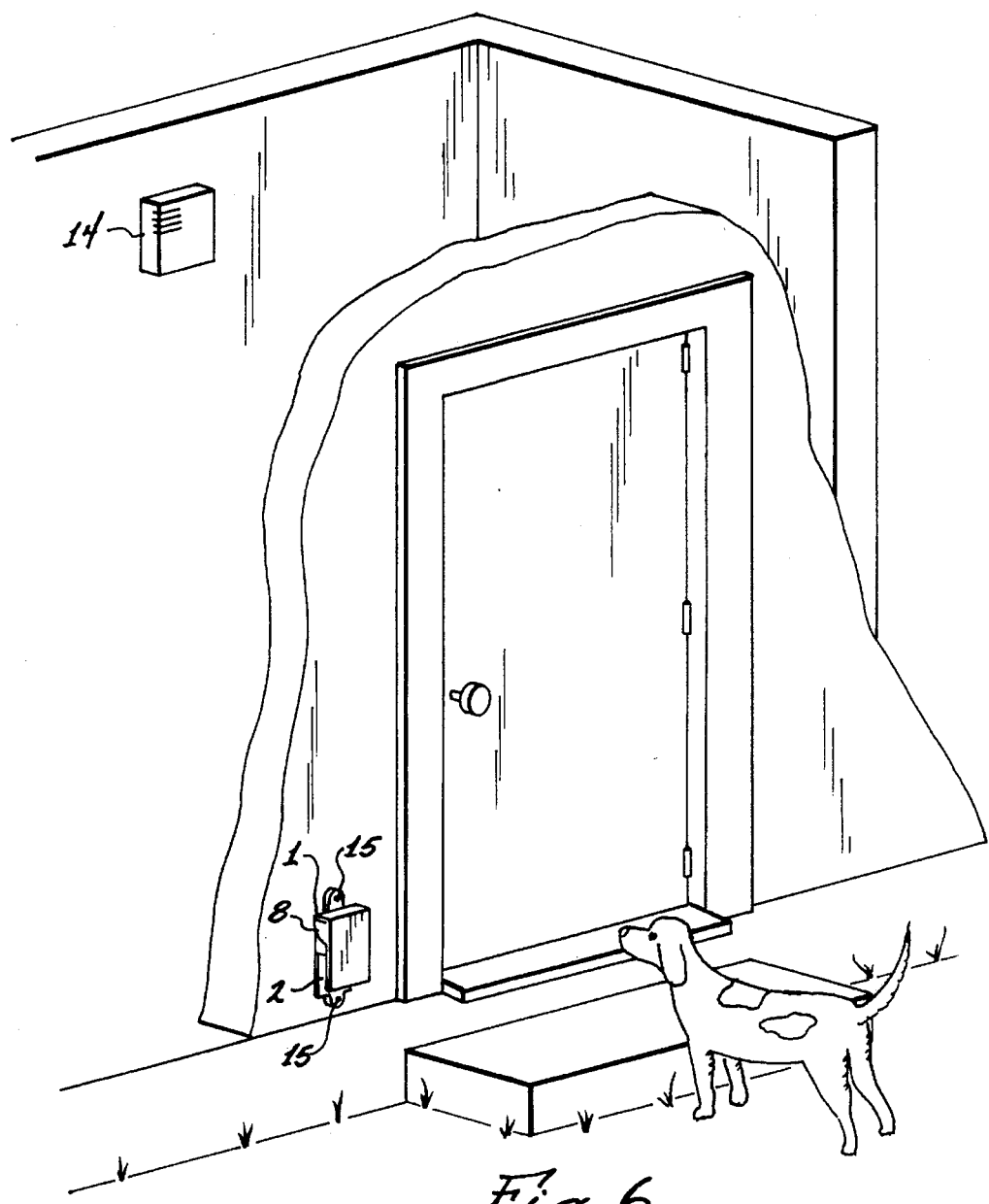
FIG. 6 is a perspective view of the unit mounted or located on an outside wall adjacent or near a door for use by a pet dog. The receiver part of the unit is shown located in the interior of the house.

In FIG. 6 the housing including preferably insulating components, ie., lid 1, base 2 and wireless transmitter 6 are shown mounted on an outside wall at any location preferably near a door for easy access by a pet dog. Once the dog touches lid 1, button 13 is depressed and transmitter 6 makes electrical wireless contact with sound receiver 14 which is located (in this figure) inside a house. After button 13 is depressed, it will automatically spring back to an inactive position just slightly out of contact with lid 1 as shown in FIG. 3. The button will push lid 1 back to its original non-active position ready to be reused. The spring-back button 13 makes it unnecessary to have metal springs or levers that can rust or deteriorate upon exposure to the weather; this is a critical factor of this invention. Even the button 13 of Heath transmitter SL-6162-TX has a plastic resilient piece for button 13 to be sprung back after depressing; thus no metal springs are required in any component of the present invention including lid 1 and base 2. Shown in FIG. 6 is the use of the sound system of this invention when a pet wishes to reenter a house. This same configuration can be used except that the unit is mounted inside the house where the pet can contact it when it wishes to leave the house. By "inwardly extending" throughout this disclosure is meant toward the other adjacent component, ie., either lid 1 or base 2. By "downwardly" or "inwardly" is meant when the unit is in a horizontal position, the component points in a vertical direction perpendicular to the horizontal. A light or other signaling means can be attached to the unit of this invention to enhance its usage if desired.

Figure 7:
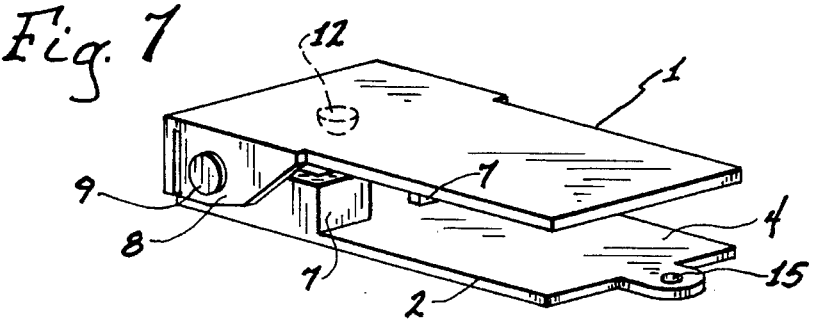
FIG. 7 is a perspective view of the assembled unit of this invention without the transmitter in place.

In FIG. 7 lid 1 and base 2 are connected by superimposing lid 1 over base 2 and inserting projections 9 into apertures 10 located in lid 1. Walls 8 of lid 1 fit outside of and enclose outside walls 7 of base 2 so that inner faces 11 and 4 of lid 1 and base 2, respectively, are movable toward each other. For the sake of clarity FIG. 7 does not show transmitter 6 in position in compartment 5, FIG. 7 is intended to show only how lid 1 and base 2 fit and interact. Obviously, the unit when fully assembled will include transmitter 6 in compartment 5 as is shown in FIG. 2.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A unit to enable a pet to attract its owner's attention by sound which comprises when assembled, a housing, a wireless transmitter and wireless sound receiver, said housing having two attached components, at least one of said components having means to move toward the other component, one of said components being a lid and another a base section, said housing containing said transmitter which is totally housed therein, said components being separable one from the other, said transmitter sandwiched in between said components and having means to become activated upon pressure applied to at least one of said components, said receiver being apart from and in wireless contact with said transmitter and having means to emit a sound when said transmitter is activated.

2. The unit of claim 1 wherein one of said components has an inwardly extending dimple that is positioned adjacent an activating means in said transmitter, said dimple when in contact with said activating means activating said transmitter and subsequently said sound receiver.

3. The unit of claim 1 wherein said housing has integral therewith a mounting means.

4. The unit of claim 1 wherein said transmitter contains an upwardly extending activation button which extends in a direction toward a dimple extending inwardly from one of said components.

5. The unit of claim 1 wherein said lid contains in an inner face thereof an inwardly extending dimple that has means to contact a button extending from said transmitter.

6. The unit of claim 1 wherein said lid has integral therewith a downwardly extending dimple that has means to contact an upwardly extending button on said transmitter, said button having means after activation to spring said dimple and said lid back to their original unactivated position.

7. The unit of claim 1 wherein said components are relatively non-conductive, lightweight and rust-proof.

8. The unit of claim 1 wherein said unit is completely void of any metal springs, levers or other exposed parts.

9. An animal actuated signaling unit comprising a wireless transmitter, a companion wireless receiver, and a housing means, said housing means containing two separable components, one a lid and the second a base portion, said lid and said base portion being movably attached at one of their terminal end portions and unattached at their opposite end portions, when assembled said components each having an inner face and an outer face, said outer face being substantially flat, said inner face of each having walls extending toward the other component, said walls defining a compartment into which said transmitter will fit and be housed, said transmitter being removable from said components and positioned so as to be activatable upon pressure on at least one of said components, said receiver being remote from and in wireless contact with said transmitter and having means to emit a sound upon activation of said transmitter.

10. The unit of claim 9 wherein one of said components has an inwardly extending dimple that is positioned adjacent an activating means in said transmitter, said dimple when in contact with said activating means activating said transmitter and subsequently said sound receiver.

11. The unit of claim 9 wherein said housing has integral therewith a mounting means.

12. The unit of claim 9 wherein said transmitter contains an upwardly extending activation button which extends in a direction toward a dimple extending inwardly from one of said components.

13. The unit of claim 9 wherein said lid contains in an inner face thereof an inwardly extending dimple that has means to contact a button extending from said transmitter.

14. The unit of claim 9 wherein said lid has integral therewith a downwardly extending dimple that has means to contact an upwardly extending button on said transmitter, said button having means after activation to spring said dimple and said lid back to their original unactivated position.

15. The unit of claim 9 wherein said components are relatively non-conductive, lightweight and rust-proof.

16. The unit of claim 9 wherein said unit is completely void of any metal springs, levers or other exposed parts.

* * * * *